(12) United States Patent
Luckman et al.

(10) Patent No.: US 9,300,343 B2
(45) Date of Patent: Mar. 29, 2016

(54) CONTROLLING ELECTROMAGNETIC RADIATION FROM AN ELECTRONIC DEVICE

(75) Inventors: Mats Anders Krister Luckman, Cypress, TX (US); Isaac Lagnado, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/397,234

(22) PCT Filed: May 3, 2012

(86) PCT No.: PCT/US2012/036227
§ 371 (c)(1),
(2), (4) Date: Oct. 27, 2014

(87) PCT Pub. No.: WO2013/165419
PCT Pub. Date: Nov. 7, 2013

(65) Prior Publication Data
US 2015/0141075 A1       May 21, 2015

(51) Int. Cl.
| H04B 1/00 | (2006.01) |
| H04B 1/3827 | (2015.01) |
| H04M 1/04 | (2006.01) |
| H04W 52/28 | (2009.01) |
| H04M 1/725 | (2006.01) |
| H04W 52/38 | (2009.01) |

(52) U.S. Cl.
CPC .............. *H04B 1/3838* (2013.01); *H04M 1/04* (2013.01); *H04M 1/72527* (2013.01); *H04W 52/288* (2013.01); *H04W 52/38* (2013.01)

(58) Field of Classification Search
None
See application file for complete search history.

(56) References Cited

U.S. PATENT DOCUMENTS

| 5,867,794 A * | 2/1999 | Hayes ................. H04B 1/38 455/550.1 |
| 7,610,027 B2 | 10/2009 | Alapuranen |
| 2002/0075189 A1* | 6/2002 | Carillo, Jr. ............ H01Q 1/245 343/702 |
| 2004/0094316 A1* | 5/2004 | Ohno .................. H01Q 1/245 174/376 |
| 2005/0014526 A1 | 1/2005 | Pan |
| 2006/0030281 A1 | 2/2006 | Brunel |
| 2010/0113111 A1 | 5/2010 | Wong et al. |
| 2010/0137042 A1 | 6/2010 | Na |
| 2010/0279751 A1* | 11/2010 | Pourseyed ........... H01Q 1/2258 455/575.7 |
| 2010/0323657 A1* | 12/2010 | Barnard ................. H04W 4/02 455/404.1 |
| 2011/0045789 A1* | 2/2011 | Sinton .................. H04W 52/10 455/127.1 |
| 2012/0044115 A1 | 2/2012 | McCaughey et al. |
| 2012/0225630 A1* | 9/2012 | Dunko .................. H01Q 1/242 455/193.1 |

FOREIGN PATENT DOCUMENTS

| IN | 03432CH2010 | 9/2011 |
| IN | 03431CH2010 | 11/2011 |

OTHER PUBLICATIONS

International Search Report and Written Opinion received in PCT Application No. PCT/US2012/036227, mailed Jan. 17, 2013, pp. 8.

* cited by examiner

*Primary Examiner* — Dominic E Rego
(74) *Attorney, Agent, or Firm* — Trop, Pruner & Hu

(57) ABSTRACT

An electronic device detects presence of an accessory that is attachable to the electronic device, where a portion of the accessory provides an electromagnetic radiation shield. The electronic device is to change a transmission power of a wireless communications module of the electronic device based on detecting presence of the accessory.

15 Claims, 6 Drawing Sheets

CONTROLLING ELECTROMAGNETIC RADIATION FROM AN ELECTRONIC DEVICE

BACKGROUND

Various electronic devices can communicate wirelessly. Examples of such electronic devices include mobile telephones, personal digital assistants, smart phones, tablet computers, notebook computers, and so forth. Wireless communications can be accomplished by use of a wireless transceiver module of an electronic device. The wireless transceiver module is able to transmit wireless signals and receive wireless signals.

BRIEF DESCRIPTION OF THE DRAWINGS

Some embodiments are described with respect to the following figures.

DETAILED DESCRIPTION

Figure 1:
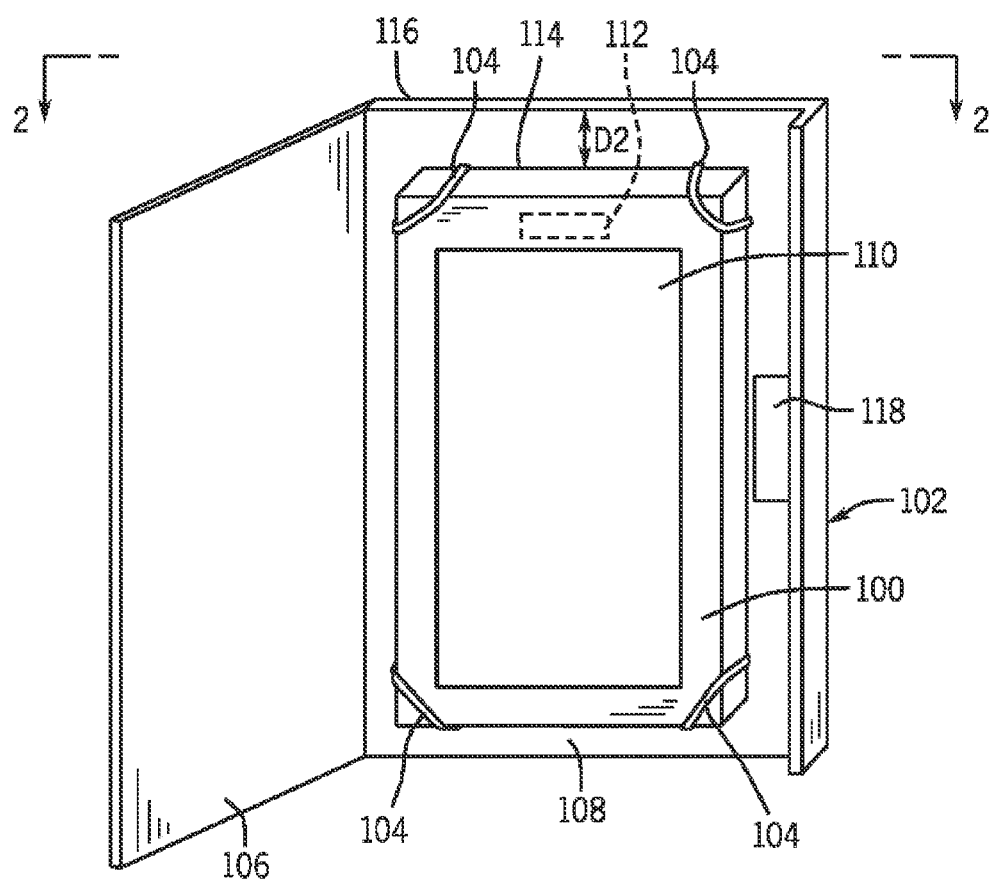
FIG. 1 is a schematic diagram of an example assembly including an electronic device and a protective case attachable to the electronic device, in accordance with some implementations.

When an electronic device capable of wireless communications is used in relative dose proximity to a user, the user can be exposed to some amount of electromagnetic (EM) radiation. To protect users from excessive exposure to EM radiation, government regulatory agencies have set radiation-related thresholds. The wireless transmissions of an electronic device are controlled such that they do not exceed the radiation-related thresholds. An example of a radiation-related threshold is a specific absorption rate (SAR), which refers to a measure of rate at which energy is absorbed by the human body when exposed to EM radiation. SAR can be expressed as power absorbed per mass of tissue (e.g. watts per gram). A government agency can specify a maximum SAR that electronic devices have to satisfy. Other types of radiation-related thresholds can include an effective radiated power (ERP) threshold, a maximum permissible exposure (MPE) time threshold, and so forth.

With some example techniques, the transmission power of a wireless communications module of an electronic device can be reduced to satisfy a radiation-related threshold. However, reducing transmission power of a wireless communications module of an electronic device can result in reduced communications performance of the electronic device. For example, signals having reduced transmission power can be more likely to be subjected to interference from other signals, which can reduce the likelihood of a successful receipt of the transmitted signals by a receiving device. Also transmitting signals with a lower power will also reduce the range of the transmitted signals.

In accordance with some implementations, techniques or mechanisms are provided within an electronic device to allow for the electronic device to detect presence of an accessory attachable to the electronic device, and to control transmission power of a wireless communications module of the electronic device based on whether or not the accessory is present. A wireless communications module includes elements, such as a signal driver, an antenna, and so forth, for transmitting wireless signals. The wireless communications module can also include elements to receive wireless signals. A wireless communications module that can transmit and receive wireless signals can be referred to as a wireless transceiver module.

The accessory that is attachable to the electronic device has at least a portion that effectively acts as an EM radiation shield between the wireless communications module of the electronic device and human tissue (e.g. hand, lap, etc.) of a user. An EM radiation shield refers to any component that attenuates or blocks EM energy (signals). In some examples, the EM radiation shield can allow a certain amount of transmitted EM energy to pass through the shield, but at an attenuated level. In other examples, the EM radiation shield can block passage of EM energy through the shield. In yet other examples, the attached accessory may merely provide additional clearance between the user and the electronic device, and this clearance itself can act as a "shield" to attenuate the signal.

In some implementations, the accessory can be a protective case in which the electronic device can be placed. The protective case has a cover that can be moved between a closed position and an open position. In the closed position, the cover can cover a front portion of the electronic device, where this front portion can include a display of the electronic device. When the cover is in the closed position, the electronic device (or a substantial portion of the electronic device) is enclosed by the protective case. When the cover is in the open position, the user is able to access the front portion of the electronic device.

In other examples, other types of accessories are attachable to the electronic device. For example, the accessory can be a sleeve into which the electronic device can be inserted. Alternatively, the accessory can provide predefined functionality that is in addition to functions provided by the electronic device. For example, the additional functionality of the accessory can include a storage functionality (to store data), a user input functionality (e.g. in the form of a keyboard of other type of user input device), a power source functionality (e.g. a battery), a data input functionality (e.g. in the form of a credit card reader), and so forth.

The electronic device has a transmission power control mechanism that is able to detect presence of the accessory. Upon detection of the presence (or absence) of the accessory, the transmission power control mechanism can adjust a transmission power of a wireless communications module in the electronic device. More specifically, if the accessory is detected, the transmission power control mechanism can increase a maximum transmission power (or transmission power ceiling) of the wireless communications module, since the presence of the accessory provides an EM radiation shield between the wireless communications module of the electronic device and a user. With the accessory attached to the electronic device, the wireless transmission power of the electronic device can be increased while still allowing a radiation-related threshold (e.g. SAR, ERP, MPE, etc.) to be satisfied. On the other hand, if the transmission power control mechanism detects that the accessory is not present, then the transmission power control mechanism can reduce the maximum transmission power (or transmission power ceiling) of the wireless communications module, to allow the electronic device to meet a radiation-related threshold.

By using techniques or mechanisms according to some implementations, the transmission power of the electronic device can be controlled to satisfy a radiation-related threshold in either a first scenario when the accessory is present, or a second scenario when the accessory is absent. As a result, the ability to satisfy the radiation-related threshold does not depend on the assumption that the accessory is attached to the electronic device when in use by a user—note that this assumption may sometimes not be true. EM radiation exposure of a user of the electronic device can thus be controlled to be within safe levels (corresponding to the radiation-related threshold).

FIG. 1 is a schematic diagram of an example assembly that includes an electronic device 100 that is attached to a protective case 102 (which is an example of an accessory that is attachable to the electronic device 100). The electronic device 100 can be a mobile telephone, a personal digital assistant, a smart phone, a tablet computer, a notebook computer, and so forth.

In examples according to FIG. 1, the electronic device 100 can be attached to the protective case 102 by straps 104. In other examples, the electronic device 100 can be attached to the protective case 102 using other attachment mechanisms.

The protective case 102 has a cover 106 that is pivotable with respect to a base 108 of the protective case 102. The cover 106 can be moved between an open position (as shown in FIG. 1), where a front portion (including a display 110) of the electronic device 100 is exposed and accessible by a user. When the cover 106 is moved to its closed position, the cover 106 covers the front portion of the electronic device 100, which provides protection for the electronic device 100, such as when the electronic device 100 is being transported by the user and not in use.

As shown in FIG. 1, the electronic device has a wireless communications module 112, which can include a signal transceiver and an antenna. The signal transceiver is able to transmit signals and receive signals through the antenna. Although just one wireless communications module is depicted in FIG. 1, it is noted that it is possible for the electronic device 100 to have multiple wireless communications modules, such as to perform wireless communications according to different wireless communications protocols.

Figure 2:
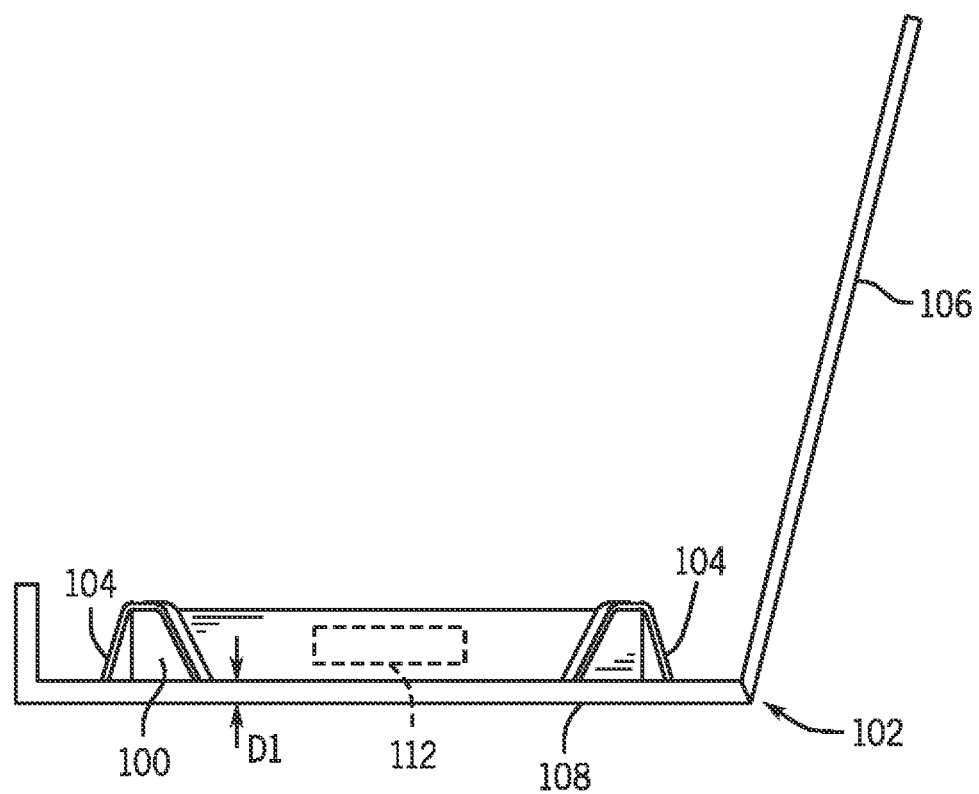
FIG. 2 is a side view of the assembly of FIG. 1.

A side view of the assembly (in direction 2-2 shown in FIG. 1) is illustrated in FIG. 2. In FIG. 2, it can be seen that the base 108 has a thickness D1. In some examples, the base 108 can be formed of a material that includes leather, plastic, or another material. The cover 106 can similarly be formed of a material that includes leather, plastic, or another material.

In normal use by a user, the protective case 102 can be set on a user's lap or can be held by a user's hand(s). The thickness D1 of the base 108 effectively provides a radiation shield between the wireless communications module 112 of the electronic device 100 and the user's lap or hand. The base 108 thus effectively reduces the amount of electromagnetic (EM) radiation exposure of the user.

Referring further to FIG. 1, a spacing D2 is shown between a side 114 of the electronic device 100 and the corresponding side 116 of the protective case 102. This spacing D2 also aids in the reduction of EM radiation exposure of the user, since the spacing D2 provided by the protected case 102 is likely to provide separation of the user's hand or other body part from the side 114 of the electronic device 100 (the side 114 is the side of the electronic device 100 closest to the wireless communications module 112).

In accordance with some implementations, a detectable object 118 is provided as part of the base 108 of the protective case 102. The detectable object 118 is detectable by the electronic device 100. Detection of the detectable object 118 allows the electronic device 100 to determine that the electronic device 100 is provided in close proximity to the protective case 102 (e.g. the electronic device 100 is attached to the protective case 102).

In some examples, the detectable object 118 includes a magnet. In other examples, the detectable object 118 can include an electronic circuit that is able to communicate with the electronic device 100 through an interface. As yet another example, the detectable object 118 can be a mechanical object that is mechanically detectable by the electronic device 100. As yet another example, the detectable object 118 can simply be a surface of the protective case 102 that can be sensed by an optical sensor (e.g. light sensor) of the electronic device 100.

Figure 3:
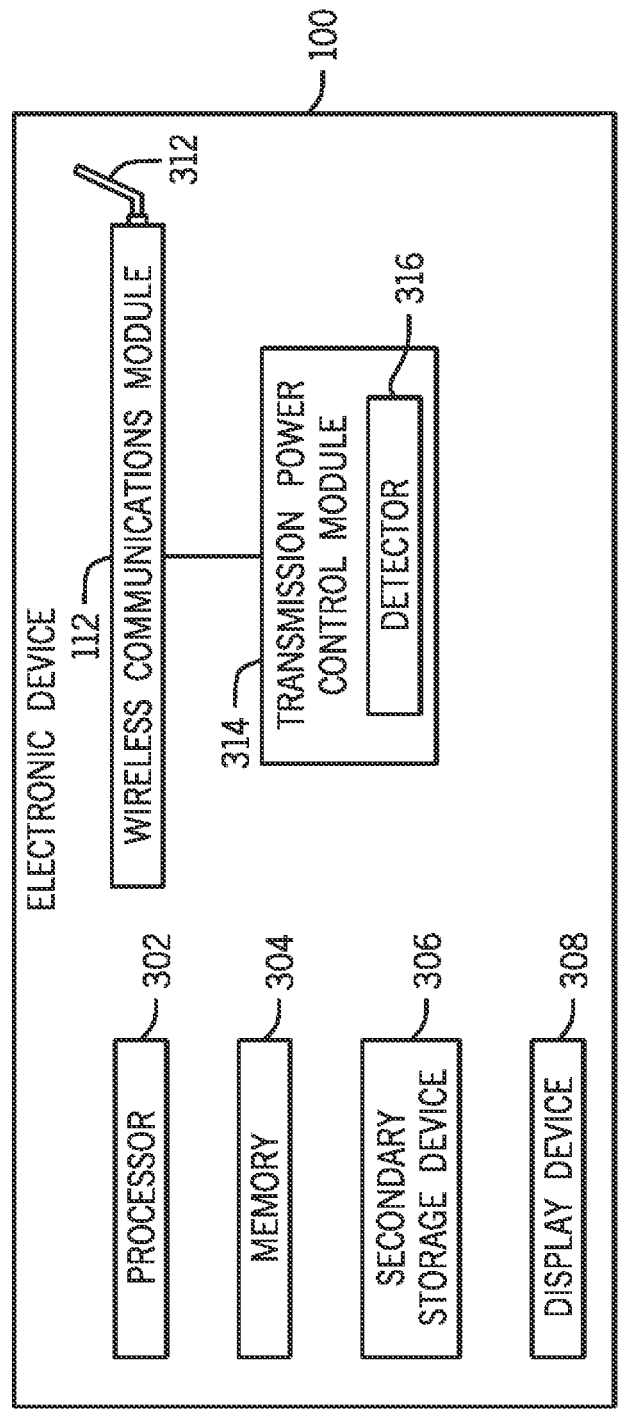
FIG. 3 is a block diagram of example components of an example electronic device, in accordance with some implementations.

FIG. 3 is a block diagram of an example arrangement of the electronic device 100. The electronic device 100 includes a processor (or multiple processors) 302, a memory 304, a secondary storage device 306, and a display device 308. The memory 304 and/or secondary storage device 306 can store machine-readable instructions 310 that are executable by the processor(s) 302. A processor can include a microprocessor, microcontroller, processor module or subsystem, programmable integrated circuit, programmable gate array, or another control or computing device.

The electronic device 100 also includes the wireless communications module 112, which has an antenna 312 to allow for transmission and receipt of wireless signals.

In accordance with some implementations, the electronic device 100 also includes a transmission power control mechanism 314, which has a detector 316 to detect presence of the detectable object 118 shown in FIG. 1. The transmission power control mechanism 314 can be implemented in hardware, implemented as machine-readable instructions executable on the processor(s) 302, or implemented as a combination of hardware and machine-readable instructions. In examples where the transmission power control mechanism 314 is implemented at least in part with machine-readable instructions, these machine-readable instructions can be in the form of software executable on the processor(s) 302, or software or firmware executable by a controller in the wireless communications module 112.

In examples where the detectable object 118 of FIG. 1 is a magnet, the detector 316 can include a switch that is actuatable by a magnetic field of the magnet. When this switch is brought into proximity to the magnet, this switch closes (or opens), which provides an indication to the transmission power protection mechanism 314 that the electronic device 100 has been brought into proximity of the accessory.

In examples where the detectable object 118 includes an electronic circuit (such as an electronic circuit that is part of a credit card reader, a user input device, a storage device, a power source, and so forth), the detector 316 can detect connection of an interface of the electronic device 100 to the electronic circuit of the detectable object 118. For example, the electronic circuit of the detectable object 118 can be docked to a USB (Universal Serial Bus) port (or other port) of the electronic device 100. Connection of the electronic circuit of the detectable object 118 to the USB port of the electronic device 100 is detectable by the detector 316, and upon detection of such electrical connection, the detector 316 can indicate to the transmission power control mechanism 314 that the electronic device 100 has been attached to the accessory.

In examples where the detectable object 118 is a mechanical detectable object, a mechanical switch can be provided on the electronic device 100 that is actuated between an open position and a closed position when the electronic device 100 is brought into contact with the detectable object 118. The opening or closing of this switch is an indication to the detector 316 of proximity to the accessory.

In further examples, the detector 316 can be associated with an optical sensor (e.g. light sensor) of the electronic device 100, where the light sensor can detect presence of the accessory based on detecting proximity of a surface of the accessory to the electronic device 100.

Figure 4:
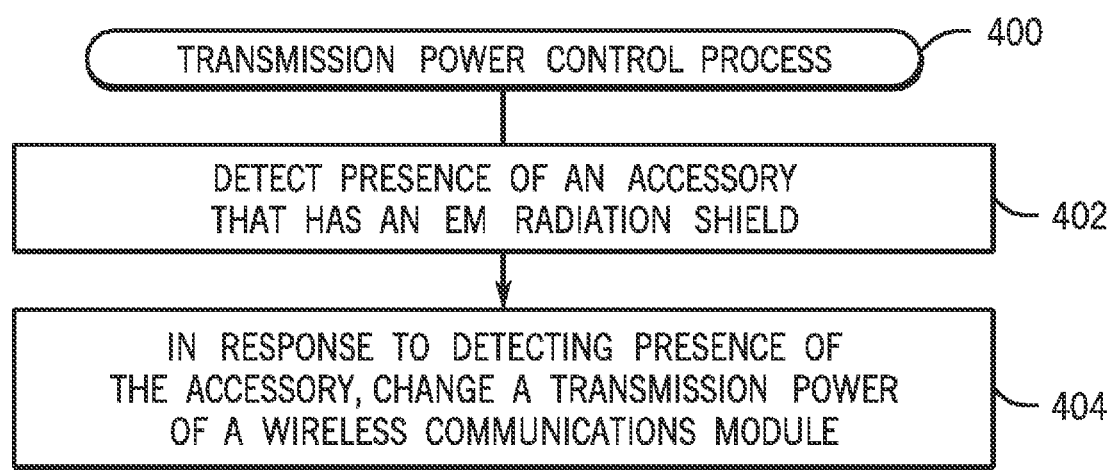
FIGS. 4 and 5 are flow diagrams of transmission power control processes, in accordance with some implementations.

FIG. 4 is a flow diagram of a transmission power control process 400 that can be performed by the transmission power control mechanism 314 according to some implementations. The transmission power control mechanism 314 detects (at 402) presence of an accessory that is attachable to the electronic device 100, where a portion of the accessory when attached to the electronic device provides an EM radiation shield. Detecting the presence of the accessory can be based on the detector 316 (FIG. 3) in the electronic device 100 detecting the detectable object 118 (FIG. 1), for example.

In response to detecting presence of the accessory, the transmission power control mechanism 314 can change (at 404) a transmission power of the wireless communications module 112. Changing the transmission power of the wireless communications module 112 can refer to changing a transmission power ceiling of the wireless communications module 112—the transmission power ceiling specifies a maximum transmission power above which the wireless communications module 112 is not to transmit at.

Figure 5:
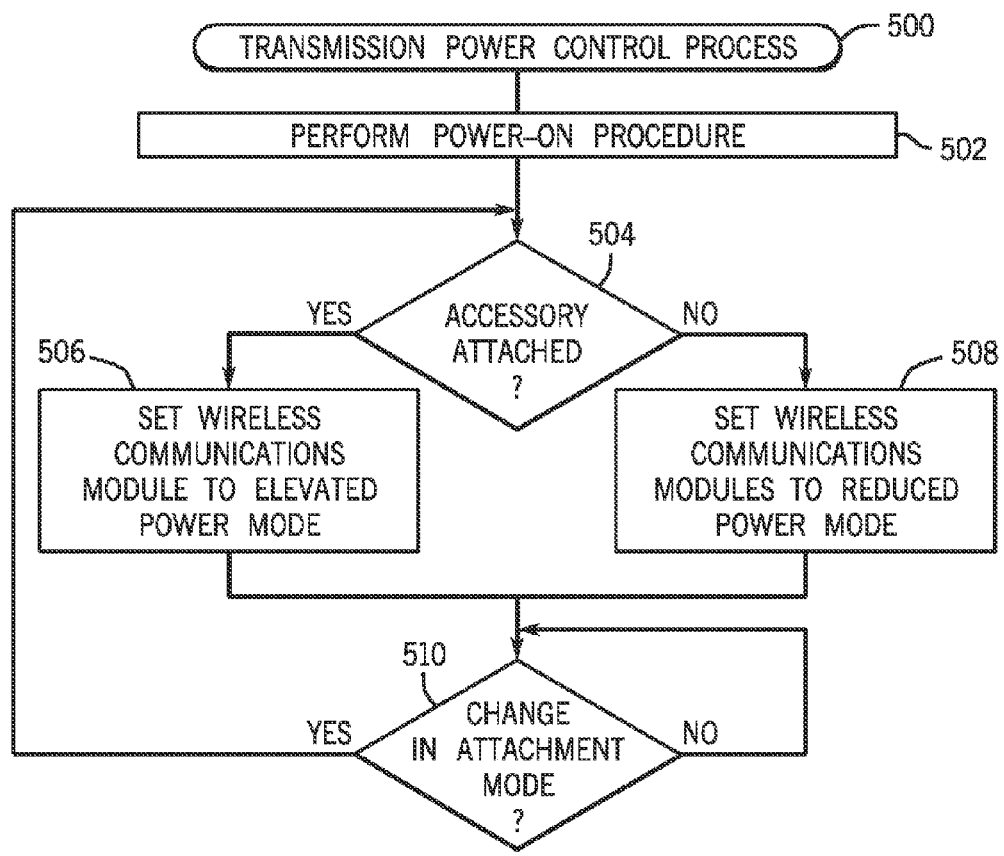

FIG. 5 shows a transmission power control process 500 according to further implementations. The electronic device 100 can perform a power-on procedure (at 502) when the electronic device 100 is first started.

Next, the transmission power control mechanism 314 of the electronic device 100 determines (at 504) whether the accessory (e.g. protective case 102 in FIG. 1) is attached to the electronic device 100 (such as based on the detector 316 of FIG. 3 detecting the detectable object 118 of FIG. 1). If the accessory is attached, then the transmission power control mechanism 314 can set (at 506) the wireless communications module 112 to an elevated power mode. On the other hand, if the accessory is not attached, then the transmission power control mechanism 314 can set (at 508) the wireless communications module 112 to a reduced power mode. In the elevated power mode, the wireless communications module 112 is able to transmit wireless signals at a higher power level than the power level of wireless transmissions when the wireless communications module 112 is in the reduced power mode.

The power transmission control mechanism 314 can intermittently (e.g. periodically or in response to other event) determine (at 510) whether there has been a change in the attachment mode of the accessory. For example, a user may have either removed the accessory from or added the accessory to the electronic device. If a change in attachment mode is not detected, then the transmission power control mechanism 314 does not make any change to the power mode of the wireless communications module 112. However, if a change in attachment mode is detected, then tasks 504, 506, and 508 are repeated.

Figure 6:
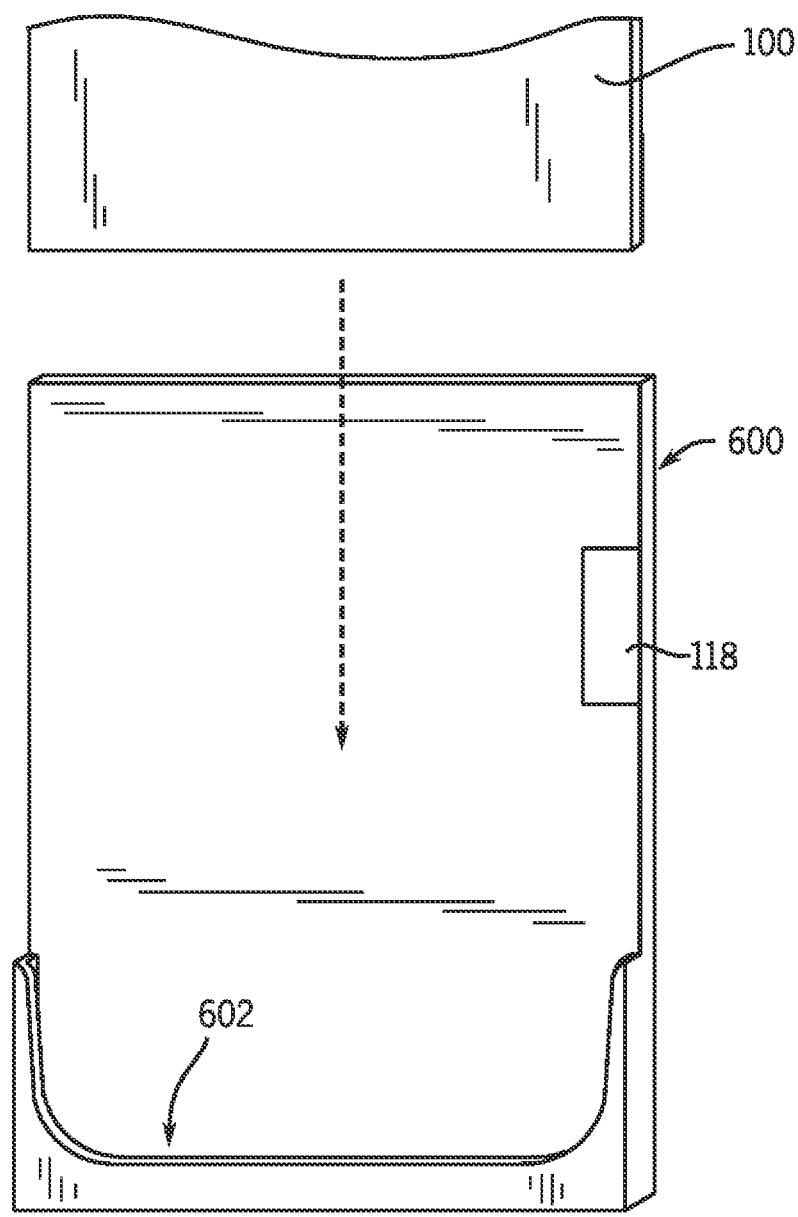
FIG. 6 is a schematic diagram of an example assembly including an electronic device and a sleeve attachable to the electronic device, in accordance with alternative implementations.

FIG. 6 shows an example of a different accessory 600 that is useable with the electronic device 100. In FIG. 6, the accessory 600 is a sleeve having a receptacle 602 into which a portion of the electronic device 100 can be inserted. The sleeve 600 can include the detectable object 118 that is detectable by the electronic device 100 to detect attachment of the sleeve 600 to the electronic device 100.

The sleeve 600 can be used to provide protection for the electronic device 100, such as protection from physical impact. In some examples, the sleeve 600 can also provide additional functionality (in addition to functions of the electronic device 100). As noted above, the additional functionality can include a storage functionality (to store data), a user input functionality (e.g. in the form of a keyboard of other type of user input device), a power source functionality (e.g. a battery), a data input functionality (e.g. in the form of a credit card reader), and so forth.

There can be numerous other examples of accessories that are attachable to the electronic device 100.

Using techniques or mechanisms according to some implementations, the transmission power of the wireless communications module 112 can be adjusted to satisfy an EM radiation-related threshold, such as SAID or other type of radiation-related threshold. The electronic device can be used with or without the accessory, with the radiation-related threshold being satisfied in either scenario.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of controlling electromagnetic radiation from an electronic device, comprising:
   detecting, by the electronic device, presence of an accessory that is attachable to the electronic device, where a portion of the accessory when attached to the electronic device provides an electromagnetic radiation shield; and
   in response to detecting presence of the accessory, changing, by the electronic device, a transmission power of a wireless communications module of the electronic device.

2. The method of claim 1, wherein changing the transmission power comprises increasing a transmission power ceiling of the wireless communications module.

3. The method of claim 2, further comprising:
   in response to detecting absence of the accessory, reducing the transmission power ceiling of the wireless communications module.

4. The method of claim 1, wherein detecting presence of the accessory comprises detecting presence of a protective case having a cover moveable between an open position and a closed position.

5. The method of claim 1, wherein detecting presence of the accessory comprises detecting presence of a sleeve into which the electronic device is insertable.

6. The method of claim 1, wherein detecting presence of the accessory comprises detecting presence of the accessory that provides a functionality in addition to functions of the electronic device.

7. The method of claim 1, wherein detecting the presence of the accessory comprises detecting based on proximity of the electronic device to a magnet of the accessory.

8. The method of claim 1, wherein detecting the presence of the accessory comprises detecting based on electrical connection to an electronic circuit of the accessory.

9. The method of claim 1, wherein detecting the presence of the accessory comprises detecting based on mechanical interaction between the electronic device and the accessory.

10. The method of claim 1, wherein detecting the presence of the accessory comprises detecting using an optical sensor to detect proximity of the accessory.

11. An electronic device comprising:
   a wireless communications module to perform wireless communications; and
   a control mechanism for controlling electromagnetic radiation from the electronic device, the control mechanism to:
      detect an object of an accessory that has a portion for providing an electromagnetic radiation shield;
      increase a transmission power ceiling of the wireless communications module in response to detecting the object; and
      reduce the transmission power ceiling of the wireless communications module in response to not detecting the object.

12. The electronic device of claim 11, wherein the control mechanism is to detect the object using at least one selected from the group consisting of: detect the object that includes a magnet, detect electrical connection in an electronic circuit of the object, detect mechanical interaction with the object, and detect by use of an optical sensor.

13. The electronic device of claim 11, wherein the control mechanism is to detect the object that is part of the accessory selected from the group consisting of a protective case and a sleeve.

14. An accessory for attachment to an electronic device, comprising:
   a base to support the electronic device, wherein the base provides an electromagnetic radiation shield; and
   a detectable object in the base, the detectable object being detectable by a detector of the electronic device to cause adjustment of a transmission power of a wireless communications module of the electronic device based on detection of presence of the detectable object by the detector, for controlling electromagnetic radiation from the electronic device.

15. The accessory of claim 14, comprising one of a protective case and a sleeve.

* * * * *